(12) United States Patent
Fuchs

(10) Patent No.: US 6,328,775 B1
(45) Date of Patent: Dec. 11, 2001

(54) PROTECTION SYSTEM AGAINST THE PENETRATION OF CONTAMINATED AIR AND BLAST WAVES INTO A PROTECTIVE SPACE

(75) Inventor: Albrecht Fuchs, Zikhron Yaaqov (IL)

(73) Assignee: Beth-El Zikhron-Yaaqov, Zikhron-Yaaqov (IL)

( * ) Notice: Subject to any disclaimer, the term of this patent is extended or adjusted under 35 U.S.C. 154(b) by 0 days.

(21) Appl. No.: 09/415,202

(22) Filed: Oct. 12, 1999

(51) Int. Cl.[7] .................. B01D 35/147; B01D 29/56; B01D 53/34
(52) U.S. Cl. .............. 55/385.2; 55/467; 55/417; 55/469; 55/486; 55/505; 96/422; 109/1 S
(58) Field of Search .................. 55/385.2, 485, 55/486, 417, 467, 469, 505, DIG. 34; 96/422; 109/1 S; 454/902

(56) References Cited

U.S. PATENT DOCUMENTS

| | | | |
|---|---|---|---|
| 2,014,840 | * 9/1935 | Geiger et al. | 109/1 S |
| 3,075,448 | * 1/1963 | Cohen | 109/1 S |
| 4,631,872 | * 12/1986 | Daroga | 109/1 S |
| 4,707,953 | * 11/1987 | Anderson et al. | 52/63 |
| 5,115,613 | * 5/1992 | McCarthy | 109/1 S |

* cited by examiner

*Primary Examiner*—David A. Simmons
*Assistant Examiner*—Robert A. Hopkins
(74) *Attorney, Agent, or Firm*—Jacobson Holman, PLLC

(57) ABSTRACT

The invention provides a compact, portable system for protection against the penetration of contaminated air into a protected space. The system includes a gas filter and an air-intake unit. There is also a blower for sucking air through the filter into the protected space. An air exhaust unit is provided with an over-pressure valve. For actuating the blower, a member is provided. With the system as described, at least the filter, the blower and the means for actuating the blower can be removed, stored and reassembled by the user.

16 Claims, 4 Drawing Sheets

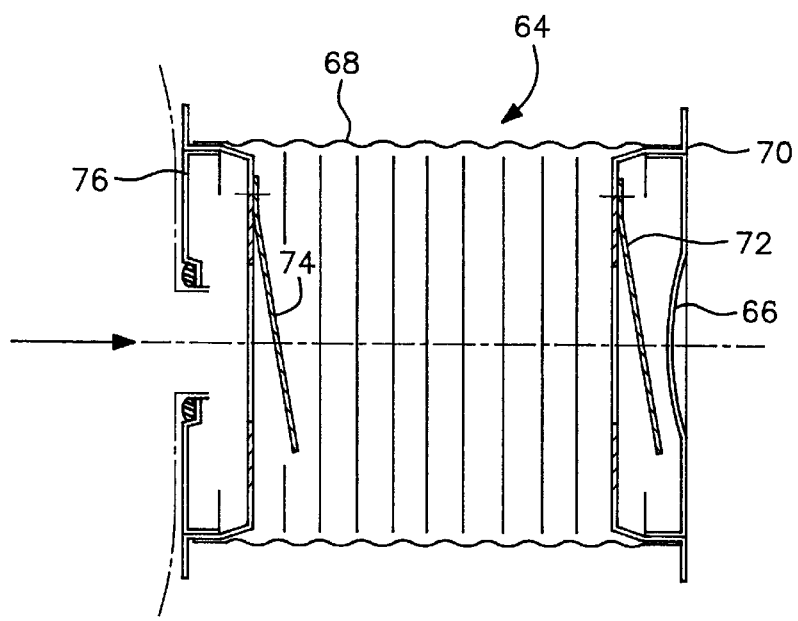
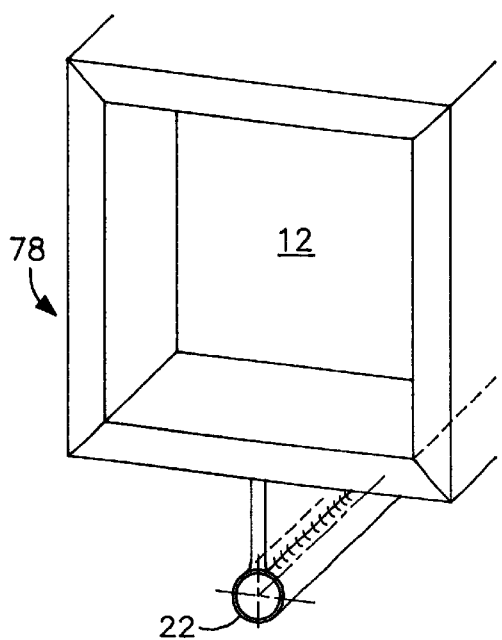
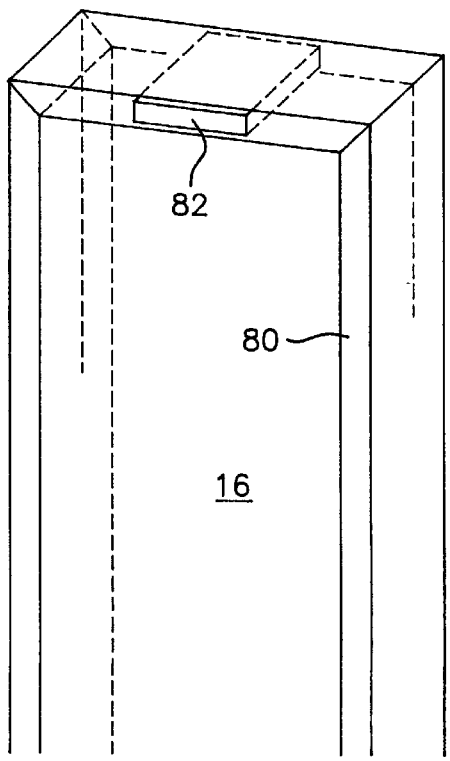

PROTECTION SYSTEM AGAINST THE PENETRATION OF CONTAMINATED AIR AND BLAST WAVES INTO A PROTECTIVE SPACE

FIELD OF THE INVENTION

The present invention relates to a novel filtration system. More particularly, the invention concerns a filtration system for preventing the penetration of contaminated air, including nuclear, biological or chemical (NBC)-contaminated air, into a bomb shelter or any other closed space.

BACKGROUND OF THE INVENTION

For protection against attacks by non-conventional weapons such as NBC, there is the sealed room, which replaces the ventilated bomb shelter. Both the sealed room and the bomb shelter present disadvantages. In a sealed room, difficulties are encountered in obtaining tightly sealed doors and windows in order to prevent the penetration of contaminated air. A main disadvantage of bomb shelters is that their ventilation and filtration systems require too much space, are generally fixed in one location, and cannot be easily and quickly relocated.

DISCLOSURE OF THE INVENTION

In view of the above problems, there has long been felt a need for a new air filtration system which can be easily dismantled when not in use and reassembled in a short time when required.

It is therefore an object of the present invention to provide a compact and portable filtration system for protection against contaminated air, including NBC-contaminated air.

It is yet another object of the present invention to provide an air filtration system for protection against NBC-contaminated air that is relatively inexpensive. In accordance with the present invention, there is therefore provided a compact, portable system for protection against the penetration of contaminated air into a protected space, said system comprising a gas filter; an air-intake unit; a blower for sucking air through the filter into the protected space; an air exhaust unit provided with an over-pressure valve and means for actuating the blower, wherein at least the filter, the blower and the means for actuating the blower can be removed, stored and reassembled by the user.

The system of the present invention is easily mountable, easily removable, easily stored, and all of its storable components have a maximum total weight of less than 20 kg, for a six-person protected space.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a perspective illustration of the inside of a sheltered room, showing the filter system of the present invention as installed;

FIG. 2 is a perspective illustration of the inside of a sheltered room, when the filter system is disassembled;

FIG. 3 is a perspective view of the outside of a building showing a filter system installed on every floor;

FIG. 4 is a cross-sectional view of an air intake unit installed below a window;

FIG. 5 is a cross-sectional view of an exhaust outlet of the filter system of FIG. 1;

FIG. 6 illustrates an NBC filter unit of the filter system;

FIG. 7 illustrates a filter unit installed to be manually operated with an air intake bellows;

FIG. 8 is a cross-sectional view of the air intake bellows of FIG. 7;

FIG. 9 is a perspective view of a window frame with an externally attached conduit for mounting an air intake unit, and FIG. 10 is a perspective view of a door frame having an integrated conduit for mounting an air exhaust outlet.

DETAILED DESCRIPTION OF PREFERRED EMBODIMENTS

According to the present invention, there is provided a compact and mobile system for turning a room into a protected space and for preventing penetration of contaminated air into the sheltered space. The system can be easily dismantled when not needed and can easily be reassembled in a short time during a crisis. The provided filter supplies filtered air to the sheltered space, maintaining an over-pressure relative to the air pressure outside said space. Such a system is most required for protected rooms. In the event that a door of such a room is opened to prevent suffocation of the occupants, their gas masks may not always provide the required protection, since certain types of gases are capable of entering the body through the skin.

Operation of the system of the present invention is based on the suction of air by a blower through a blast valve into the protected space. In the case of an explosion, the blast valve immediately closes, thus providing protection against the penetration into the shelter of blast waves.

Incoming air flows through an NBC filter, consisting of three main components: (a) a pre-filter, used as a dust filter; (b) an aerosol filter, and (c) an active carbon filter. From the filter, the purified air flows through the blower and enters the room. The pressurized air flows through the protected area and is released to the outside through an exhaust valve.

Normally, the exhaust valve is closed and will automatically open to out-flowing air. Accordingly, the pressure created within the protected area will be higher than that outside, preventing outside gases from entering. This over-pressure is very important, in view of the existing risk of the eventual forming of a hole in the protected space and entry of contaminated air through the hole. The over-pressure will cause contaminated air to be pushed out of the hole, preventing it from entering the protected space.

Among the advantages of the system of the invention is that it can be assembled and dismantled without the need of tools or any special equipment.

Figure 1:
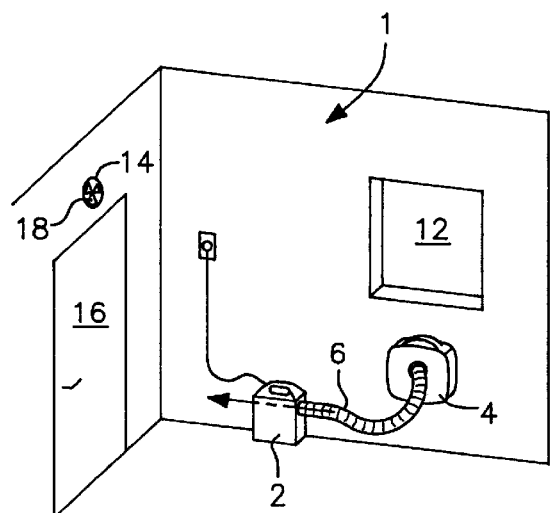

Referring now to the drawings, FIG. 1 illustrates the inside of a sheltered room 1. An electric blower 2 is connected to an NBC or gas filter 4 by means of hose 6.

Figure 4:
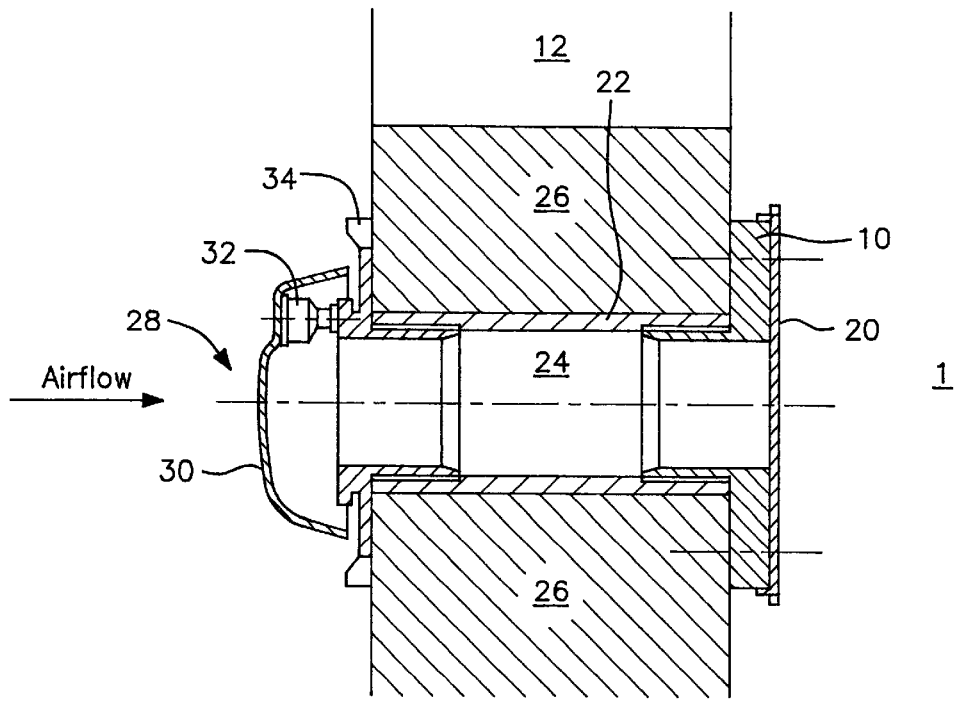

Filter 4 is advantageously connected to the air intake unit 8, as shown in greater detail in FIG. 4, with a quick-connect flange 10. Electric blower 2, operated from the mains or by battery, sucks air into the air intake unit and then through filter 4, wherein dust, biological and chemical contaminants are removed. The purified air is then propelled into the room by blower 2.

The filter 4 and blower 2 are preferably installed beneath a window 12. The air circulates through the room and is ventilated through the exhaust unit 14 to the outside. The exhaust unit 14 is preferably mounted over a door 16, and produces a controlled over-pressure within the protected area. By means of a built-in flow indicator 18, it can be confined whether the air is properly ventilated through the automatic exhaust unit 14 and whether the over-pressure has been attained and prevails.

Figure 2:
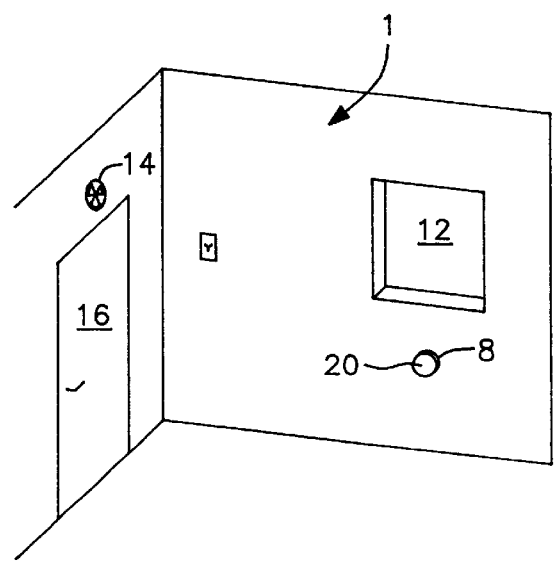

FIG. 2 illustrates the inside of a sheltered room 1 when the filter system is disassembled. The intake unit 8 is closed with a cover 20, and exhaust unit 14 remains in place, as it is when the system is installed.

Figure 3:
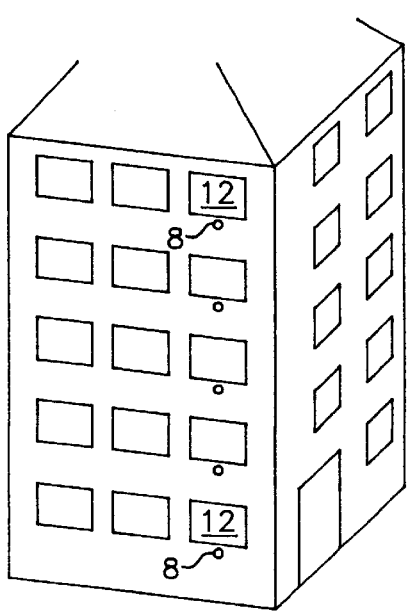

FIG. 3 illustrates the outside of a building wherein provisions are made for installing a filter system on every floor. Intake units 8 are seen, installed beneath windows 12. The assembly location of the air intake units is chosen so as to make it possible to install a filter unit on every floor above ground level. The users themselves can easily install the assemblies.

FIG. 4 illustrates a cross-section through intake unit 8. A pipe 22 is inserted through a hole 24 in wall 26 of a building or of a closed space made beneath a window 12. Pipe 22 is threaded on both ends. From the outside of the protected area, an intake valve 28 is screwed onto pipe 22. The intake valve 28, which may advantageously have an integrated explosion blast-protection means, consists of an air intake plate 30 and spring means 32 connected to the flange 34. In case of an explosion, the intake plate 30 closes within a very short time, e.g., in milliseconds, against flange 34, preventing blast waves from penetrating into the room.

Within the protected area, a connector flange 10, for connecting the filter 4, is screwed onto the other end of pipe 22. When not in use, flange 10 is normally closed with cover 20. Similar to filter 4, cover 20 is designed with a quick connection, so that when required, it can be quickly opened and filter 4 can be attached.

Intake valve 28 is designed to operate as a single unit for air intake, shrapnel protection, and a cover grid against the entrance of external objects such as rodents. Intake plate 30 is strongly constructed, so that an additional shrapnel cover is not necessary. Furthermore, the gap between the intake plate 30 and connecting flange 34 is so small that no additional cover grid is actually required.

Figure 5:
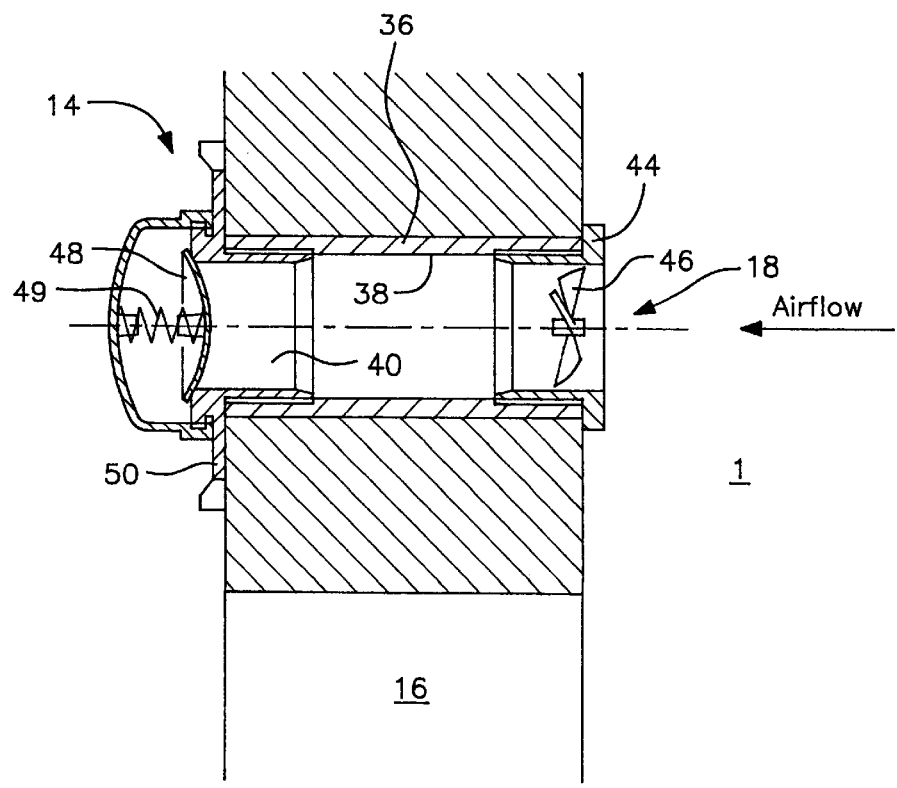

FIG. 5 illustrates a cross-sectional view of the exhaust unit 14, mounted above a door 16. Pipe 36 is inserted through a hole 38 in the wall. Pipe 36 is similar to pipe 22, being threaded at both ends. From outside the protected area 1, an exhaust valve 40 is screwed onto the end of pipe 36, and on the inside of the protected area 1, flow indicator 18 is attached to the other end of the pipe. The exhaust valve 40 may be fitted with blast-protection means similar to that of the air inlet valve 28. Flow indicator 18 consists of a connection flange 44, on whose axis a fan 46 is mounted. As soon as over-pressure prevails in the protected area, the displacement of valve plate 48 against the force of a spring 49 will cause exhaust valve 40 to automatically open. Air can then flow out between the exhaust valve plate 48 and the seat of the connection flange 50.

When air flows through the exhaust unit, the fan 46 begins to rotate. The blades of fan 46 are partially colored, in order to facilitate quick and easy viewing of the air circulation. In case lighting is unavailable, such as during a power failure, a fluorescent marking on the fan blades can be used to indicate air circulation.

Figure 6:
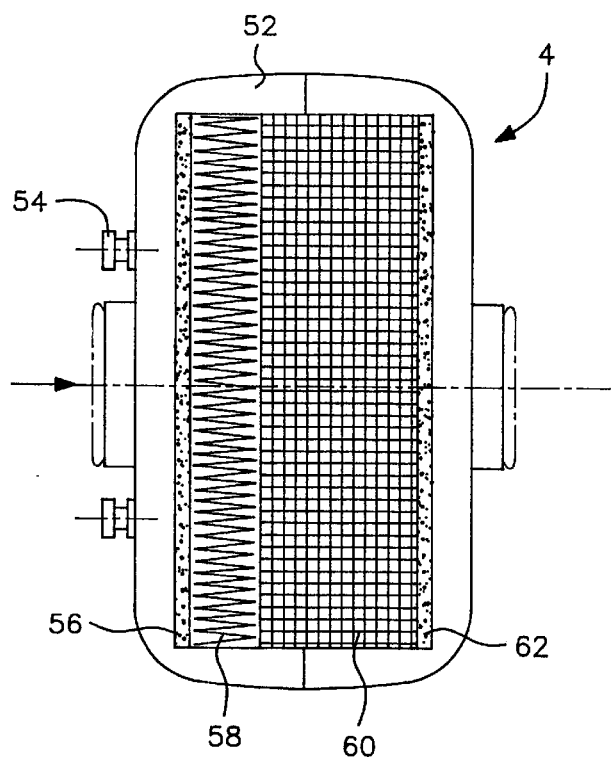

FIG. 6 is a cross-sectional view of an NBC filter 4. On housing 52 there is attached a quick-connecting flange 54, by means of which filter 4 is connected to intake unit 8. Air flows through the filter in the direction of the arrow, passes through pre-filter 56 which serves as a dust filter and separator, and then flows through aerosol filter 58, wherein biological agents, aerosols, and other particles such as dust will be separated. From this stage, the air passes through a gas filter 60. Gas filter 60 is self-supporting, eliminating the need for springs or a clamping device and a pressure-resistant housing. Finally, from filter 60, the air passes through filter fleece 62, where it is cleaned of charcoal.

Figure 7:
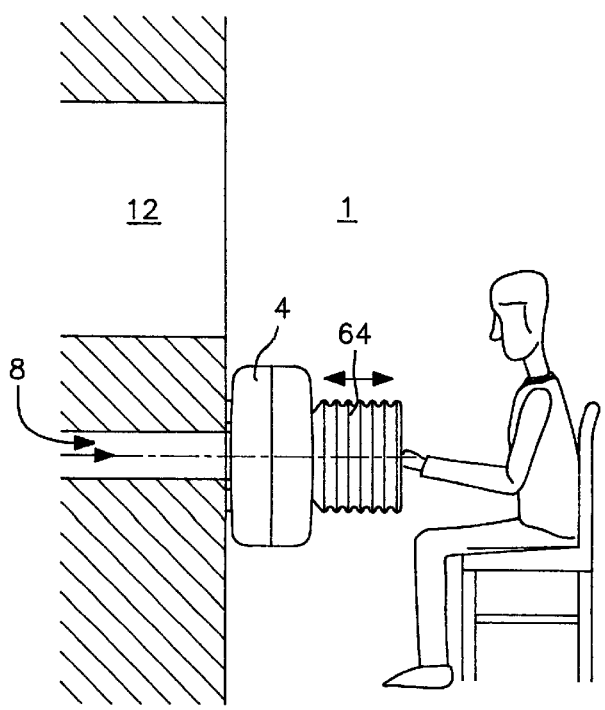

FIG. 7 is a side view of an installed filter 4, attached to an intake unit 8 beneath a window 12. To the filter 4 is affixed an air intake bellows 64, which is manually operable. Bellows 64 is a manual backup in case of power failure or depletion of the internal battery backup, or a defect in the electric blower. Air intake bellows 64 is also affixed to the filter 4 by means of a quick connector. As shown, an operator can place himself in front of the air intake bellows and operate it manually.

FIG. 8 is cross-sectional view of the air intake bellows 64. A handle 66 is attached to one end of bellows sleeve 68 by means of an end unit 70. Also seen are the bellows valves 72, 74. The other end of sleeve 68 is attached to a connection unit 76, allowing it to be connected to the filter 4.

FIG. 9 illustrates a window frame assembly 78 having an externally attached pipe 22. The assembly can be put in place when the concrete of the building is cast, thus eliminating the need to bore a hole through the building wall.

FIG. 10 illustrates a door frame 80, made separately or with an integrated channel 82. The frame 80 and the channel assembly can be affixed into place when the concrete of the building is cast, thus eliminating the need to bore a hole through the wall.

Likewise, window frame 78 can be formed with an integral pipe 22, passing through a section of the frame itself.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A system for protection against the penetration of contaminated air into a protected space delimited by walls, said system comprising:
 a stationary air intake unit having a quick-connect flange mounted in a wall of said protected space;
 a stationary air exhaust unit mounted in a wall of said protected space, provided with an over-pressure valve;
 a portable gas filter having an inlet and outlet, said inlet being connectable to said stationary air intake unit by means of said quick-connect flange;

a portable blower communicating with the outlet of said filter, and means for actuating said blower;

wherein at least said filter and blower are installable, removable and storable and can be reassembled without the use of tools.

2. The system as claimed in claim 1, wherein said filter contains at least two of the following three filter levels in a single housing:

a) a pre-filter for dust separation;

b) a filter of the aerosol type, and c) a filter with a chemical compound possessing the property of absorbing poisonous gases.

3. The system as claimed in claim 2, wherein said chemical compound is selected from an active carbon type compound.

4. The system as claimed in claim 1, wherein said filter is made of materials which may be incinerated after use.

5. The system as claimed in claim 1, wherein said filter is directly affixed to said air intake.

6. The system as claimed in claim 1, wherein said stationary air intake unit and stationary air exhaust unit comprises intergrated explosion blast-protection means.

7. The system as claimed in claim 6, wherein said blast-protection means is adapted to prevent external objects from entering into said protected space.

8. The system as claimed in claim 1, wherein said blower is electrically operable from mains power supply.

9. The system as claimed in claim 1, wherein said blower is manually operable by means of a bellows.

10. The system as claimed in claim 1, wherein a window frame of said protected space is provided with an integral pipe for inserting said air intake unit.

11. The system as claimed in claim 1, wherein a door frame of said protected space is provided with an integrated opening for inserting said exhaust unit.

12. The system as claimed in claim 1, wherein said air intake unit, said blower and said air exhaust unit are installed and interconnectable without the aid of tools.

13. The system as claimed in claim 1, wherein said stationary air intake unit comprises integrated explosion blast-protection means.

14. The system as claimed in claim 1, wherein said stationary air exhaust unit comprises integrated explosion blast-exhaust protection means.

15. The system as claimed in claim 1, wherein said blower is electrically operable from a battery.

16. A system for protection against the penetration of contaminated air into a protected space delimited by walls, said system comprising:

a stationary air intake unit mounted in a wall of said protected space;

a stationary air exhaust unit provided with an automatically actuated, over-pressure blast valve having an air flow indicator, mounted in a wall of said protected space;

a portable gas filter having an inlet and outlet, said inlet being connectable to said stationary air intake unit;

a portable blower communicating with the outlet of said filter; and means for actuating said blower;

wherein at least said filter and blower are installable, removable and storable and can be reassembled without the use of tools.

* * * * *